United States Patent [19]
Klaeger

[11] Patent Number: 5,146,733
[45] Date of Patent: Sep. 15, 1992

[54] WIDE SWATH MOWER AND METHOD OF MOWING

[76] Inventor: Joseph H. Klaeger, P.O. Drawer 445, Hondo, Tex. 78861

[21] Appl. No.: 664,834

[22] Filed: Mar. 5, 1991

[51] Int. Cl.$^5$ .................. A01D 75/18; A01D 75/30
[52] U.S. Cl. .......................... 56/6; 56/10.4; 56/12.7
[58] Field of Search .............. 56/6, 10.4, 12.1, 12.7, 56/15.2, DIG. 14

[56] References Cited

U.S. PATENT DOCUMENTS

| | | | |
|---|---|---|---|
| 2,732,675 | 1/1956 | Smith et al. | 56/6 |
| 3,070,938 | 1/1963 | Winget | 56/6 |
| 3,135,079 | 6/1964 | Dunn | 56/6 |
| 3,177,638 | 4/1965 | Johnson | 56/7 |
| 3,665,685 | 5/1973 | Allard | 56/10.4 |
| 3,721,074 | 3/1973 | Heth | 56/10.4 |
| 3,731,470 | 5/1973 | Cornis et al. | 56/10.4 |
| 3,750,376 | 8/1973 | Cioni | 56/10.4 |
| 3,962,849 | 6/1976 | Stoessel et al. | 56/10.2 |
| 4,009,555 | 3/1977 | Temple | 56/10.2 |
| 4,173,110 | 11/1979 | Hansen, Jr. | 56/10.2 |
| 4,179,870 | 12/1979 | Rowse | 56/6 |
| 4,183,195 | 1/1980 | James | 56/11.9 |
| 4,301,642 | 11/1981 | Thurber | 56/12.7 |
| 4,432,192 | 2/1984 | Maier et al. | 56/15.3 |
| 4,495,754 | 1/1985 | Cartner | 56/11.9 |
| 4,506,464 | 3/1985 | Cartner | 37/91 |
| 4,518,043 | 5/1985 | Anderson et al. | 172/6 |
| 4,573,306 | 3/1986 | Smith et al. | 56/10.4 |
| 4,697,405 | 10/1987 | DeWitt et al. | 56/10.4 |
| 4,747,255 | 5/1988 | Roden | 56/10.4 |
| 4,854,112 | 8/1989 | Holley et al. | 56/6 |
| 4,887,417 | 12/1989 | Parsons, Jr. | 56/15.2 |
| 4,901,508 | 2/1990 | Whatley | 56/10.4 |
| 4,907,400 | 3/1990 | Roden | 56/10.4 |
| 4,942,724 | 7/1990 | Diekhans et al. | 56/10.4 |
| 4,956,965 | 9/1990 | Parsons, Jr. | 56/15.1 |

*Primary Examiner*—David J. Bagnell
*Attorney, Agent, or Firm*—Vaden, Eickenroht, Thompson, Boulware & Feather

[57] ABSTRACT

Method and apparatus for mowing a wide swath which is preferably hydraulically powered to provide reliability, efficiency, and ease of operation. The apparatus includes a rear section, or chassis, to which side-by-side wings are mounted which are pivotable by hydraulic cylinders from a folded position for trailering from location to location to an open position for mowing operations, the extent of pivoting being used to vary the width of the swath to be mowed. The wings are each provided with a second hydraulic cylinder for controlling the amount of weight on the casters mounted in the individual mowers mounted to the wings and a pressure regulator which compensates for changes in the pressure in the hydraulic cylinder to support a selected portion of the weight of the wing as the portion of the weight supported by the casters changes as the casters follow the contour of the swath being mowed.

18 Claims, 6 Drawing Sheets

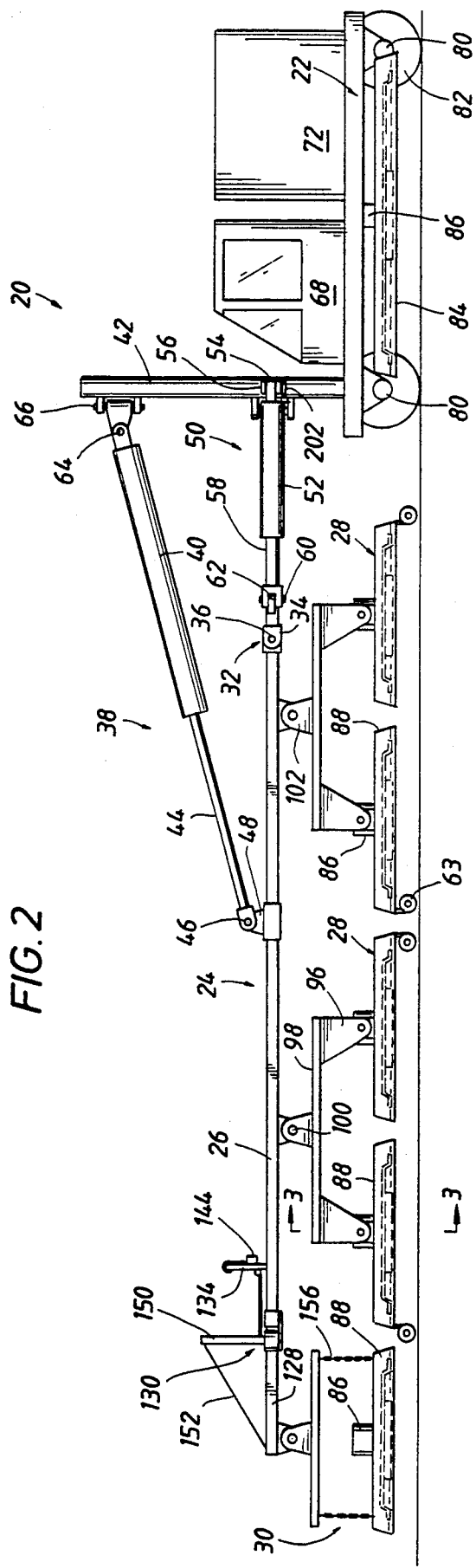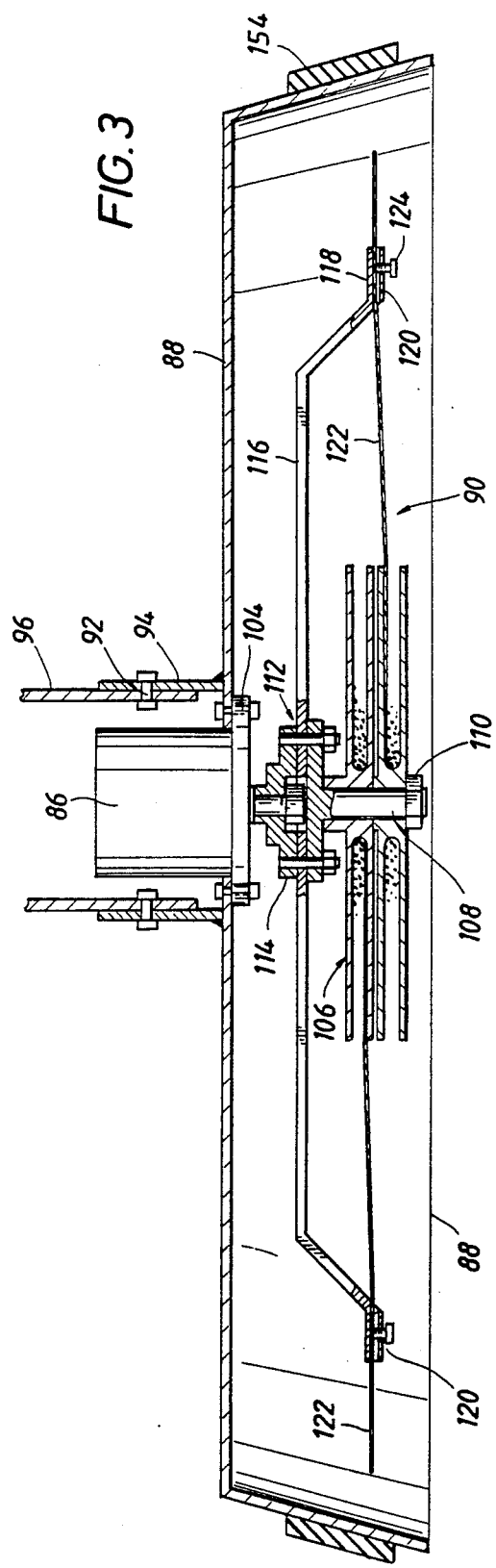
FIG.2
FIG.3

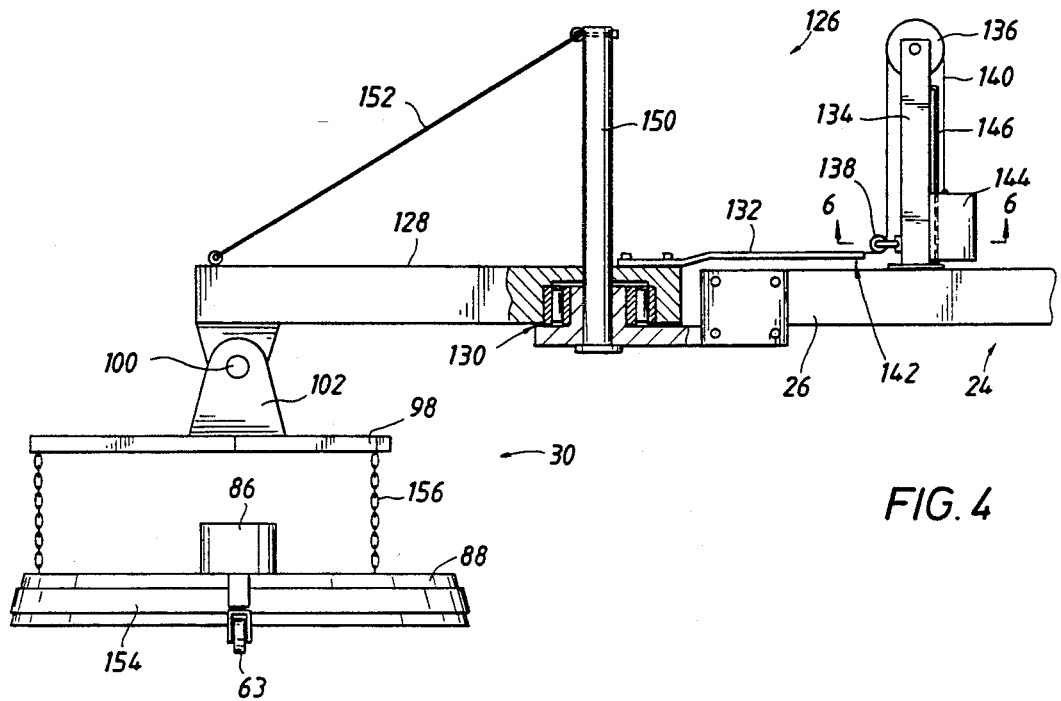
FIG. 4
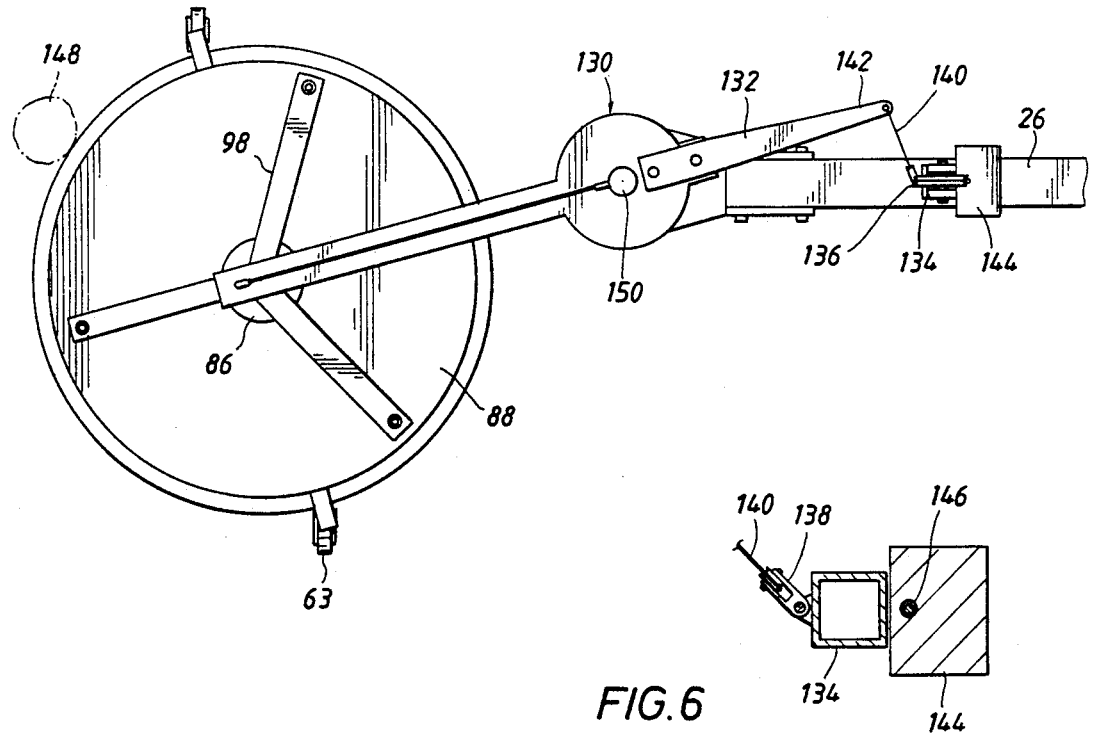
FIG. 5
FIG. 6

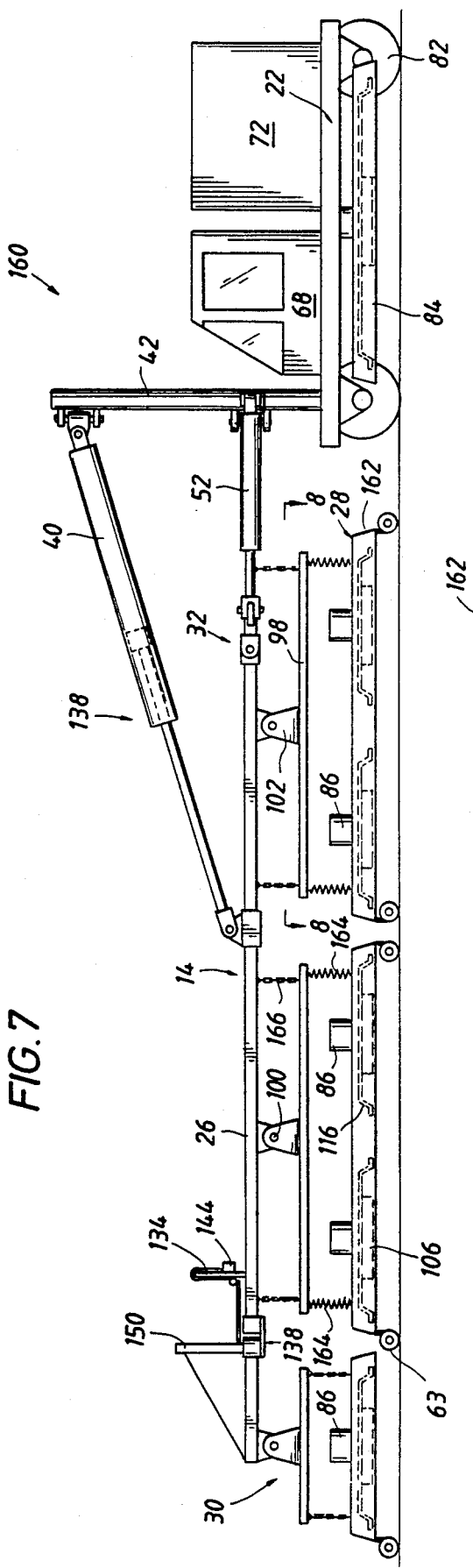

WIDE SWATH MOWER AND METHOD OF MOWING

BACKGROUND OF THE INVENTION

The present invention relates to a method and apparatus for mowing a wide swath in a single pass of the mowing apparatus. In more detail, the present invention relates to a method and apparatus capable of mowing a swath up to three times wider than conventional known mowing equipment without compromising the efficiency and reliability of the apparatus.

Most heavy-duty and/or commercial mowers used in the mowing industry for mowing the shoulders of highways and other open expanses of grass or other ground cover such as is found at airports and the like are designed to be pulled and powered by farm tractors. Such mowers generally consist of a central mower pulled behind the farm tractor with side-mounted mowers on wings as shown in U.S. Pat. Nos. 3,135,079 to Dunn and 4,495,754 to Cartner. However, farm tractors and drag-type mowers are relatively expensive, and the equipment is very heavy and expensive to operate. With over three million miles of highways in the United States alone, it requires a tremendous amount of money and time to keep such right of ways mowed because such mowers generally cut a swath of only approximately 16 feet in width. Consequently, even on a relatively narrow county road, as many as three passes may be required to mow the right of way on just one side of the road. Eight to ten passes may be required to mow the right of way on one side of an interstate highway.

Additionally, such mowers are susceptible to damage from encountered obstacles so that the operator of such mowers must always watch behind the mower while mowing operations are underway. Of course the diversion of the operator's attention away from the front of an apparatus moving in a forward direction creates obvious safety problems. The above-noted U.S. Pat. No. 3,135,079 describes an impact valve assembly intended to prevent damage to the mowers from encountered obstacles, but the apparatus described in that patent is still characterized by the disadvantages imposed by the relatively narrow width of the swath being mowed and the heavy and inefficient nature of mowing operations.

U.S. Pat. No. 3,177,638 to Johnson discloses a wide swath mower that is convertible for highway travel having hydraulically-driven mower heads and a self-propelled chassis with three additional mower heads, one in front of the vehicle and two mounted to the sides. Again, however, the side-mounted mower heads pivot from the back of the chassis to a position parallel to the operator during mowing operations such that the apparatus described in that patent still suffers from the disadvantage of requiring that the operator's attention be directed elsewhere rather than to the front of the vehicle. It is, therefore, an object of the present invention to overcome these disadvantages and limitations of the known prior art apparatus for mowing the right of way of roads and/or other large expanses of grass or other ground cover.

Another object of the present invention is to provide an apparatus for mowing a wide swath which is simple to operate, highly mobile and which can be operated efficiently.

Another object of the present invention is to provide a method and apparatus for mowing a wide swath in which the operator's attention is at all times directed forward.

Another object of the present invention is to provide an apparatus for mowing a wide swath which is powered by hydraulics and therefore has no right angle drives and/or belts.

It is another object of the present invention to provide an apparatus capable of mowing a swath of up to three times wider than conventional, known mowers, and to which additional section(s) can be added once the site is reached, but which is still capable of being trailered from location to location without any permits or other authorization from traffic control and/or law enforcement officials.

It is another object of the present invention to provide an apparatus for mowing a wide swath which is not likely to be damaged by impact with an encountered obstacle.

It is another object of the present invention to provide an apparatus capable of mowing a wide swath which, in addition to being capable of mowing a wider swath than conventional and/or known mowers, is better able to follow the contour of the swath being mowed than known mowers.

Another object of the present invention is to provide a method and apparatus for mowing a wide swath which is also capable of mowing around signs, trees, and other obstacle encountered during mowing operations.

Another object of the present invention is to provide an apparatus capable of mowing a swath of variable width.

It is another object of the present invention to provide a wing having a plurality of mowers mounted thereto which can be mounted to a tractor or other vehicle having a prime mover and power take off mounted thereon and which is capable of mowing a wide swath while maintaining flexibility of operation and the ability to closely follow the contour of the swath being mowed.

Other objects, and the advantages of the present invention, will be apparent of those skilled in the art from the following detailed description of a presently preferred embodiment thereof.

SUMMARY OF THE INVENTION

These objects are achieved by providing a wide swath mower comprising a chassis having a prime mover mounted thereto for powering forward movement of the chassis and a vertically pivotable wing mounted thereto which is also horizontally pivotable with respect to the chassis at the proximal end thereof. The wing is pivoted horizontally from a first, folded position for travelling to a second, open position for mowing operations. Means is mounted between the wing and the chassis for pivoting the wing from the first to the second positions. A plurality of mowers is mounted to the wing distal to the chassis, each mower being powered by the prime mover, for mowing a wide swath when the wing is pivoted to the second position and a wheel is mounted on the wing for supporting a first portion of the weight of the wing when the wing is in the second position. Means is mounted between the wing on the chassis for supporting a second portion of the weight of the wing when the wing is in the second position and means is provided for increasing and decreasing the second portion of the weight of the wing in response to an increase or decrease, respectively, in the first portion of the weight of the wing supported by the wheel to pivot the wing vertically to maintain the first portion of the weight of the wing at a selected weight, thereby causing the mowers mounted on the wing to follow the contour of the swath being mowed. The apparatus is also provided with means for stopping forward movement of the chassis upon horizontal pivoting of the wing from the second position in a direction away from the first position when one of the mowers mounted to the wing encounters an obstacle during forward movement of the chassis.

These objects can also be achieved by providing the above-described wing having the mowers mounted thereto and adapting the wing for mounting to a tractor or other vehicle having a prime mover mounted thereon. The wing is adapted to be mounted so as to be both horizontally and vertically pivotable with respect to the vehicle.

Also provided is a method for mowing a wide swath comprising the pivoting of a wing mounted to a chassis at the proximal end thereof and having a prime mover mounted thereto from a first, folded position to a second, open position for mowing operations, powering forward movement of the chassis with the prime mover to commence mowing operations, supporting a first portion of the weight of the wing during mowing operations with the wheel mounted on the wing, and supporting a second portion of the weight of the wing from the chassis. The wing is pivoted vertically in response to changes in the first portion of the weight of the wing supported by the wheel to maintain a plurality of mowers mounted on the wing distal to the chassis at a desired height during mowing operations. Forward movement of the chassis is stopped when one of the mowers encounters an obstacle, causing the wing to pivot horizontally from the second position in a direction away from the first position.

BRIEF DESCRIPTION OF THE DRAWINGS

FIG. 2 is a side, elevational view of the apparatus of FIG. 1 from the aspect of the lines 2—2 in FIG. 1.

FIG. 3 is a partial sectional view, taken along the lines 3—3 in FIG. 2, of the apparatus of FIG. 1.

FIG. 4 is a partially-broken away detail view of the distal end of one of the wings of the apparatus of FIG. 1.

FIG. 5 is a top, plan view of the distal end of the wing shown in FIG. 4 as the mower mounted thereto encounters an obstacle during mowing operations.

FIG. 6 is a sectional view, taken along the lines 6—6 in FIG 4, of the apparatus in FIG. 1.

FIG. 7 is a side, elevational view similar to FIG. 2 of an alternative embodiment of the apparatus of FIG. 6.

FIG. 8 is a sectional view, taken along the lines 8—8 in FIG. 7, of the apparatus of FIG. 7.

DETAILED DESCRIPTION OF THE PREFERRED EMBODIMENTS

Figure 1:
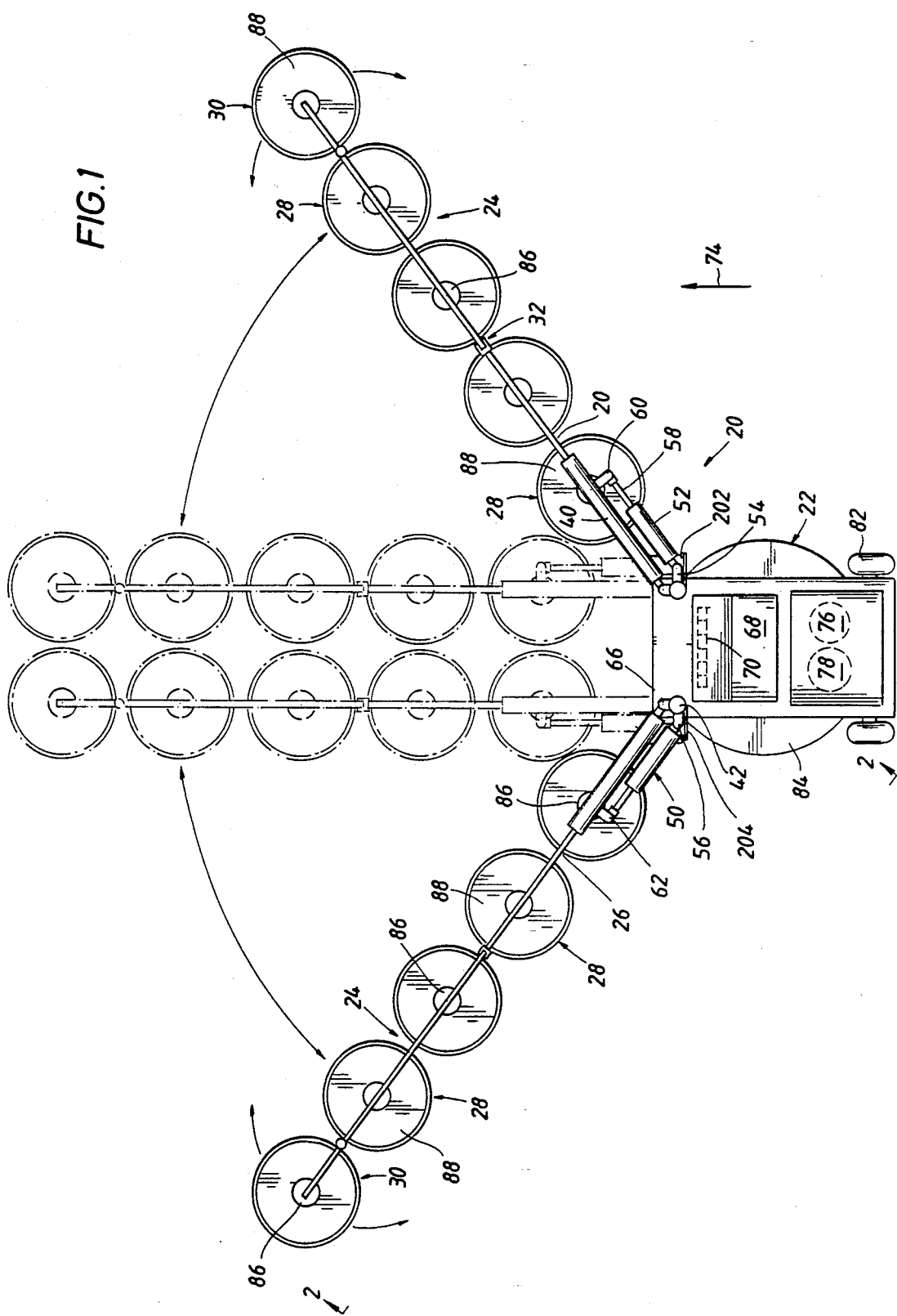
FIG. 1 is a top, plan view of a presently preferred embodiment of a mowing apparatus constructed in accordance with the present invention.

Referring now to the accompanying figures, a presently preferred embodiment of an apparatus constructed in accordance with the teachings of the present invention is indicated generally in FIG. 1 at reference numeral 20. The mowing apparatus 20 is comprised of three main components, a chassis 22 and two side-by-side wings 24 of identical construction such that like reference numerals are used to refer to both, mounted at their proximal ends to chassis 22. Each of the wings 24 is comprised of a boom 26, a plurality of mowers 28 mounted to the boom 26 distal to chassis 22, and a mower 30 mounted to the boom 26 on the end of each wing 24 distal to chassis 22. As shown in FIG. 2, each wing 24 is provided with a pivot 32, in the form of a U-joint 34 and pin 36, and means, indicated generally at reference numeral 38, mounted between chassis 22 and wing 24 for vertically pivoting the wing. In the preferred embodiment shown, vertical wing pivoting means 38 takes the form of hydraulic cylinder 40, one end of which is mounted to the post 42 which is integral with chassis 22 and the ram 44 of which is pivotally mounted to wing 24 by the pin 46 journaled in a hole (not numbered) in the ear 48 integral with the boom 26 of wing 24 to allow pivoting of wing 24 about pivot 32.

Each wing 24 is also provided with means, indicated generally at reference numeral 50, for pivoting the wing horizontally from a first, folded position, shown in shadow lines in FIG. 1, to a second, open position for mowing operations. Horizontal wing pivoting means 50 comprises a second hydraulic cylinder 52 mounted between chassis 22 and wing 24. One end of hydraulic cylinder 52 is pivotally mounted to an angle arm 54 which is integral with the post 42 mounted at 56 to chassis 22, and the ram 58 of hydraulic cylinder 52 is pivotally mounted at 60 to a lever arm 62 which is integral with the boom 26 of wing 24 whereby activation of hydraulic cylinder 52 to retract ram 58 causes the pivoting of wing 24 from the afore-mentioned first to second positions and extension of the ram 58 of hydraulic cylinder 52 causes the wing 24 to pivot from second to first positions.

In another presently preferred embodiment, vertical pivoting means 38 is mounted to chassis 22 separately from horizontal pivoting means 50, and preferably further back on chassis 22 toward prime mover 72 (see below), e.g., between the front and back axles 80. In this embodiment, part of the load from supporting the wings 24 is transferred not only to chassis 22 through vertical pivoting means 38 as will be explained, but also to both axles 80 of chassis 22. Horizontal pivoting means 50 may also be mounted to chassis 22 at a point different from the pivot point 51 (see FIG. 2) to which wing 24 is mounted on post 42. The advantage to the arrangement of this latter embodiment (not shown) is the additional leverage which can be gained for horizontal pivoting of wing 24 from first to second positions and back again; although it is not necessary to gain that additional leverage, such an arrangement makes it possible to utilize a smaller hydraulic cylinder 52, or to use gears (not shown) in place of hydraulic cylinder 52, to accomplish the horizontal pivoting of wing 24. It is because of these alternative constructions that the arrangement of hydraulic cylinder 52, angle arm 54, pivot point 56, pivot mount 60, and lever arm 62 is referred to herein as horizontal pivoting means 50.

A wheel, preferably in the form of the casters 63 (see FIG. 2) mounted on each mower 28, is mounted to wing 24 for supporting a first portion of the weight of the wing when wing 24 is in the second position, the vertical pivoting means 38 supporting the remainder of the weight of wing 24 from the chassis 22 when wing 24 is in the second position. Pivoting means 38 is capable of supporting all of the weight of wing 24 upon retraction of the ram 44 of hydraulic cylinder 40, a capability which is particularly advantageous when wing 24 is in the first, folded position for traveling. Hydraulic cylinder 40 is provided with both vertical 64 and horizontal 66 pivot mounts at post 42 to provide for both the vertical and horizontal pivoting of wing 24 under the influence of the respective hydraulic cylinders 52 and 40.

Figure 10:
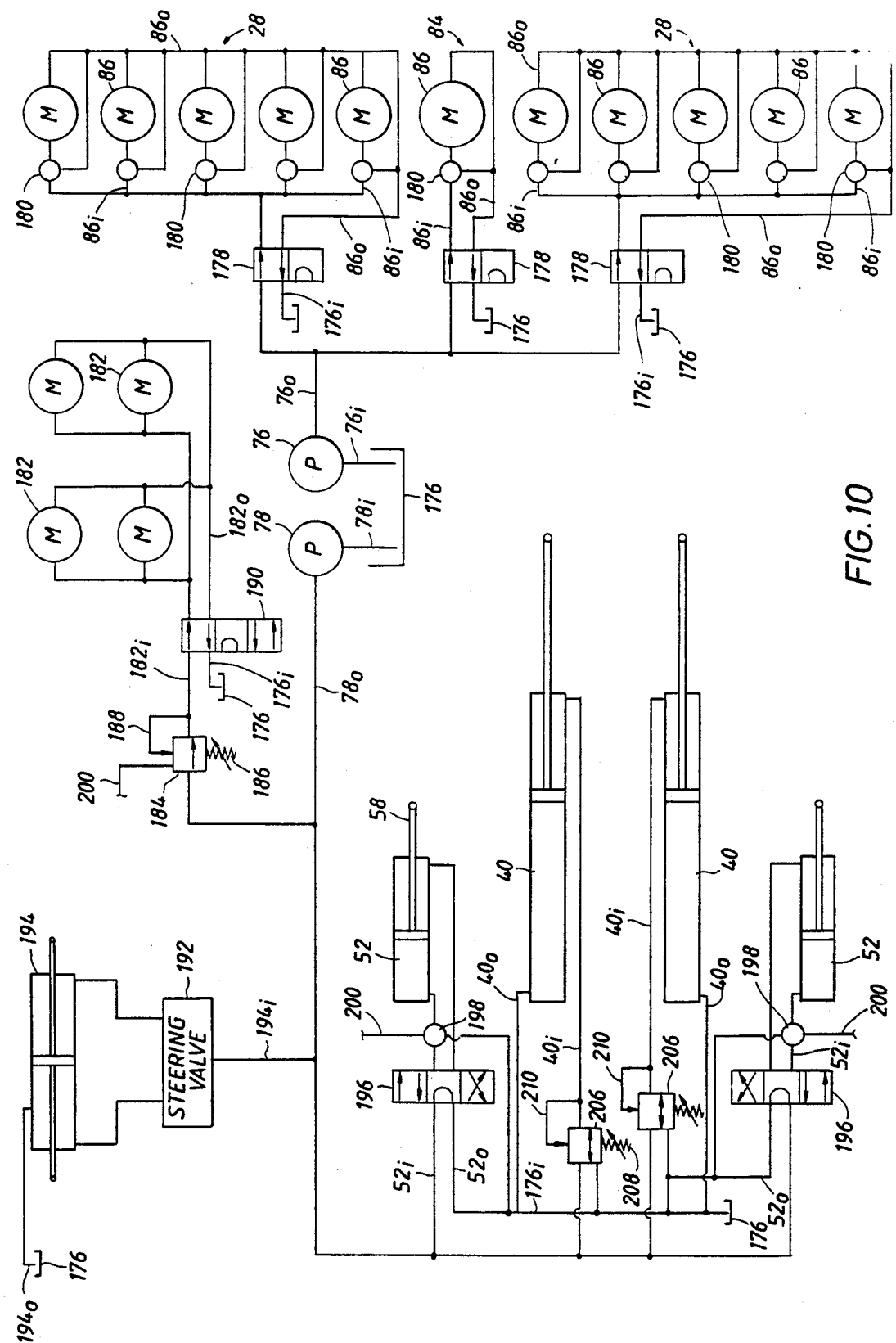
FIG. 10 is a schematic of a presently preferred hydraulic system for controlling operation of the apparatus in FIG. 1.

The chassis 22 is provided with a cab 68 for enclosing the operator and the controls, indicated generally at reference numeral 70 on FIGS. 1 and 2, and a prime mover 72 is also mounted thereto. The prime mover 72 can be any engine of sufficient horsepower to adequately power forward movement, e.g., in the direction of arrow 74 on FIG. 1, and to power the plurality of mowers 28 mounted to wings 24. Preferably the prime mover 72 is used to power two hydraulic pumps, the first pump 76 being sized to furnish sufficient hydraulic fluid pressure to the mowers 28 to operate mowers 28 at a relatively constant RPM and a second pump 78 for supplying hydraulic fluid to the transmission (not shown) for driving either one or both of the axles 80 to which the wheels 82 are mounted. The use of two pumps 76 and 78 and separate hydraulic circuits as shown in FIG. 10 allows variation of the speed of forward movement of chassis 22 without changing the RPM of prime mover 72 or the mowers 28; however, some efficiencies of operation and cost savings in construction are realized by, for instance, providing hydraulic oil to both pumps 76 and 78 from a common reservoir (shown schematically on FIG. 10), mounting the hydraulic fluid cooling coil (not shown) with the radiator (not shown) for prime mover 72, and using other such arrangements as are known in the art.

Chassis 22 is preferably also provided with a mower 84. Each of the mowers 28 and 84 is preferably powered by a respective hydraulic motor 86 receiving hydraulic fluid from first pump 76 (see FIG. 10). However, those skilled in the art who have the benefit of this disclosure will recognize that the use of pump 76 and hydraulic motors 86 is but one way of driving the mowers 28 and 84, chosen for purposes of efficiency and the absence of such structure as right angle gears, universal joints, and the like, it also being quite possible to power the mowers 28 and 86 pneumatically or with chain, gear, and/or belt drive from a power take-off (not shown) directly on prime mover 72.

Referring now to FIGS. 2 and 3, each of the mowers 28 and their mounting to the boom 26 of wing 24 will now be described. Each mower 28 is comprised of the respective hydraulic motor 86, a shroud 88, cutting means 90, and the caster 63 mounted to each shroud 88. Each shroud 88 is suspended on the pins 92 through the integral flange 94 thereof from the tongues 96 on either end of yoke 98. Yoke 98 is itself suspended from the boom 26 of wing 24 by the pin 100 through the ear 102 integrated therewith. The base 104 of each hydraulic motor 86 is bolted through a hole (not numbered) in the respective shroud 88 and cutting means 90 is comprised of a cable reel 106 mounted on the driveshaft 108 of motor 86 which extends below each shroud 88. In the preferred embodiment shown in FIG. 3, cable reel 106 is actually comprised of two cable reels bolted one on top of the other, mounted to driveshaft 108 between a retaining nut 110 and a spline assembly 112 which sandwiches a clamp assembly 114 onto the driveshaft 108. The clamp assembly 114 is comprised of two arms 116 having angled ends 118 with a passageway 120 therethrough for the cable 122 and a screw clamp 124 for engaging the cable 122 to retain the free end of cable 122 at a selected length. The free end of cable 122 is the cutting element, and when the cable 122 wears or breaks, the operator simply stops the forward movement of chassis 22, raises the wing 24, loosens the screw clamp 124, pulls the desired length of cable 122 off of the respective reel 106, and re-tightens the screw clamp 124 to retain the free end of the cable 122 at that selected length once mowing operations with the apparatus 20 are re-stated. In the embodiment shown, braided steel cable of approximately $\frac{1}{8}$ inch diameter is wound onto reels 106 for use as the cutting element, but for use in cutting heavier brush, cable of larger diameter, or even steel blades, can be utilized as the cutting element.

Those skilled in the art who have the benefit of this disclosure will recognize that the mowers 28 shown in the figures are but one way in which the mowing can be accomplished. If desired, each of the rotary mowers 28 can be replaced with a reel or sickle-type mower (not shown). One advantage of the construction shown in the figures is the ease with which individual mowers 28 can be replaced such that the operator can carry an extra mower 28 on the chassis 22 at all times so that, in the event of a failure of one of the mowers 28, that mower can be replaced with the extra mower 28 by simply disconnecting two hydraulic hoses (the hoses are not shown in FIGS. 1-9 for purposes of clarity, but the hoses to be disconnected are one each of the lines $86_i$ and $86_o$ shown in FIG. 10) and the two connecting pins 92.

An even more important advantage of the mowing apparatus 20 is the ability of the apparatus to mow a wide swath while still avoiding the occasional obstacle likely to be encountered during mowing operations. When the operator spots an obstacle, the appropriate control (see FIG. 10) is activated to pivot the wing 24 on the side of the obstacle from the second, open position for mowing operations toward the first, folded position of the wing a distance sufficient to avoid the obstacle altogether. Note also that by pivoting either or both of the wings 24 to a position intermediate the first and second positions, the width of the swath being mowed can be varied.

Adding to this ability of the mower 20 to avoid obstacles is the mower 30 mounted on the end of each wing 24 distal to chassis 22, which is horizontally pivotable with respect to the wing 24 from a center position co-linear with the wing as shown in FIG. 1 to facilitate mowing operations around an encountered obstacle. Referring to FIGS. 4-6, this horizontally pivotable mower 30 is shown in more detail. The mower 30 is comprised of a shroud and hydraulic motor of similar construction to the shroud 88 and motor 86 of each of the mowers 28, and may be provided with one or more casters 63 and means, indicated generally at reference numeral 126, for returning the horizontally pivotable mower 30 to the center position co-linear with wing 24 pivoting. Center return means 126, in the preferred embodiment shown in FIGS. 4 and 5, takes the form of a swing arm 128 pivotally mounted to wing 24 on a bearing assembly 130 having an eccentric arm 132 bolted thereto on the proximal side (proximal to the chassis 22) of bearing assembly 130. Center return means 126 further comprises a support bracket 134 mounted on the boom 26 of wing 24 having a pulley 136 journaled in the top thereof with a pivoting idler pulley 138 mounted on the distal side of support bracket 134 see FIG. 6 for receiving a cable 140 anchored to the proximal end 142 of eccentric arm 132, the cable 140 being routed up the distal side of support bracket 134, over pulley 136, and down to a deadweight 144 mounted on the rail guide 146 on the proximal side of support bracket 134.

The constant downward force provided by deadweight 144 causes the pivoting mower 30 to tend towards the center position co-linear with the wing 24 (see FIG. 1) so that, if an obstacle 148 is encountered by the shroud 88 thereof, causing the mower 30 to pivot from the center position, the constant pull of deadweight 144 will return the swing arm 128 of mower 30 to that center position. Note that a portion of bearing assembly 130 is formed by the support post 150, to which a guy wire 152 is attached, the other end of guy wire 152 being anchored to the distal end of swing arm 128, so that the load imposed on bearing assembly 130 by pivotable mower 30 is more effectively transferred through the bearing assembly 130 to the boom 26 of wing 24. The shroud 88 of mower 30 is optionally provided with a bumper strip 154 (not shown on FIGS. 2 or 5 for purposes of clarity—see FIGS. 3 and 4) comprised of a resilient, or sponge-like, material and mower 30 is suspended from the yoke 98 by chains 156, the bumper strip 154 and chains 156 comprising means for protecting the mower 30, and coincidentally, the rest of mower 20, from damage resulting from impact with encountered obstacle 148.

Figure 9:
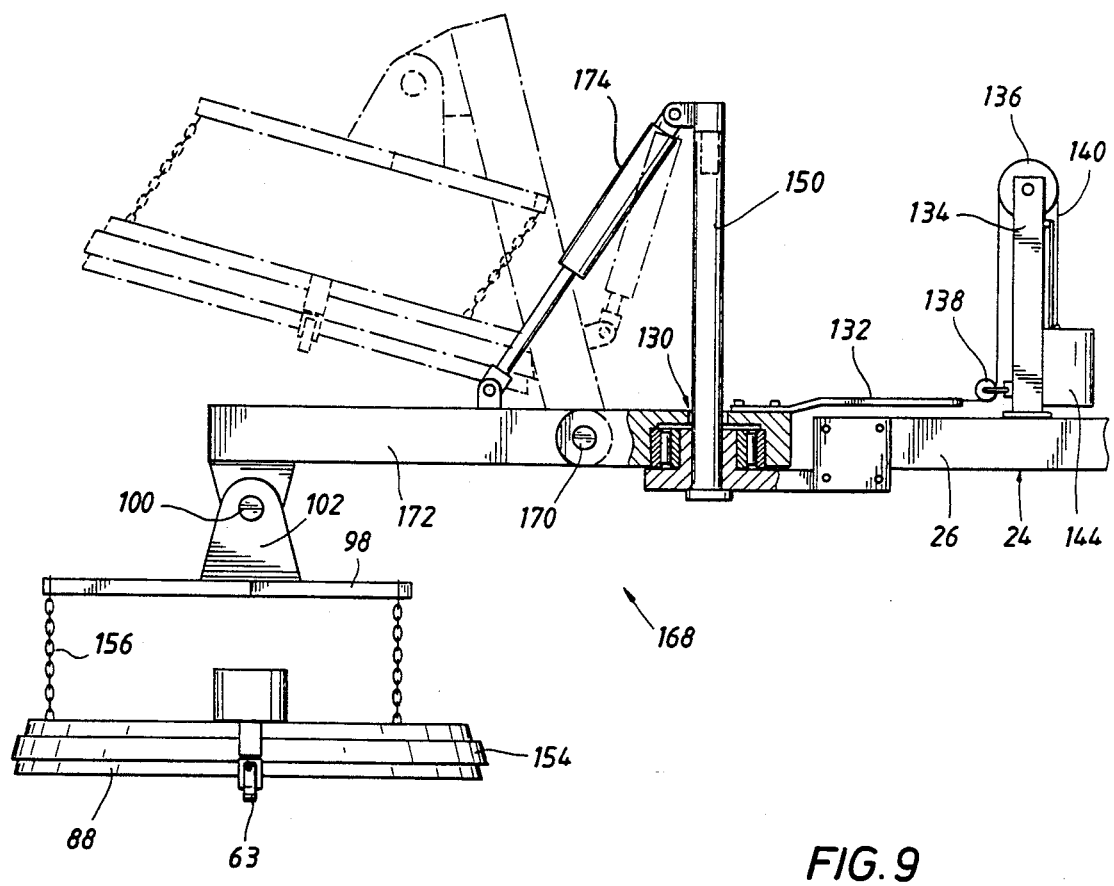
FIG. 9 is a detail view similar to FIG. 6 of the distal end of one of the wings of another alternative embodiment of the apparatus in FIG. 1.

Referring next to FIGS. 7-9, there are shown two alternative embodiments of the mowing apparatus 20 of the present invention in which like structure is given the same reference numerals as are used in describing similar structure in FIGS. 1-6. Referring first to the embodiment shown in FIGS. 7 and 8, indicated generally at reference number 160, the boom 26 of wing 24 is provided with a plurality of mowers 28 suspended therefrom in pairs under oval-shaped shrouds 162, an arrangement which provides for increased ability to follow the contour of the swath being mowed. This increase results from the suspension of each shroud 162 from its respective yoke 98 by coil springs 164 mounted at the respective ends of the yoke 98 and the oval-shaped shroud 162. In addition to allowing the mowers 28 to follow the contour of the swath being mowed, the springs 164 additionally comprise the above-described means for protecting the mowing apparatus of the present invention from damage resulting from impact with an encountered obstacle 148 in that the resilience they provide helps to absorb the impact to protect the other structure of mower 160. The shroud 162 and coil springs 164 are so effective at allowing the mowers 28 to follow the contour of the swath being mowed that each yoke 98 is provided with limit chains 166 at either end thereof to prevent excessive pivoting of the yoke 98 and shroud 162 along the long axis thereof.

Referring now to FIG. 9, there is shown another presently preferred alternative embodiment of the mower of the present invention, and in particular, of a pivoting mower 168 similar to the pivoting mower 30 mounted distally on wing 24. The pivoting mower 168 is provided with a pivot point 170 in the swing arm 172 and a hydraulic cylinder 174 pivotally mounted between swing arm 172 and support post 150 for pivoting the mower 168 vertically from a first, horizontal position for mowing operations to a second, raised position (shown in shadow lines in FIG. 9) for avoiding obstacles, loading onto a trailer for traveling, decreasing the width of the swath being mowed, or in other circumstances when raising mower 168 is advantageous. Hydraulic cylinder 174, although not shown in the hydraulic schematic shown in FIG. 10, is preferably operated by a line and appropriate controls (not shown in FIG. 9) in the same hydraulic circuit as the hydraulic cylinders 40 and 52.

The operation of the mowing apparatus of the present invention can be summarized by reference to the schematic diagram of a hydraulic circuit suitable for powering the mower 20. Those skilled in the art who have the benefit of this disclosure will recognize that the schematic shown in FIG. 10 is but one way of controlling the various functions of the mower 20, provided herein for purposes of exemplification and not by way of limitation. As set out above, mower 20 is provided with separate pumps 76 and 78, both powered by prime mover 72. Pumps 76 and 78 draw oil or other hydraulic fluid from a common supply or reservoir 176 through respective suction lines $76_i$ and $78_i$ and pump the hydraulic fluid out through respective high pressure lines $76_o$ and $78_o$ to the respective separate circuits. Pump 76 powers the motors 86 of the mowers 28 and 84 and pump 78 powers the various hydraulic cylinders, power steering, and drive functions of mower 20.

In more detail, pressure line $76_o$ splits before passing through the control valves 178 mounted on control panel 70 in cab 68, one each of control valves 1768 being provided for powering the motors 86 mounted to each of the two wings 24 (not shown in FIG. 10) and for powering the hydraulic motor 86 of the mower 84 mounted to chassis 22 (also not shown in FIG. 10). Each of the control valves 178 is a two position spool valve allowing the flow of hydraulic fluid therethrough to the hydraulic motors 86 in a first position and bypassing the motors 86 in the second position by returning the hydraulic fluid to the reservoir 176 through return lines $176_i$. Each of the hydraulic motors 986 is provided with pressure-activated bypass 180 in the respective line $86_i$ to route fluid past a motor 86 which malfunctions or which encounters an obstacle and is unable to rotate into the respective line $86_o$ to prevent damage to the motor 86.

As noted above, the axle(s) 80, steering, and control functions of mower 20 are controlled by hydraulic fluid in the second hydraulic circuit powered by pump 78. The pressure output line $78_o$ from second pump 78 splits to drive the hydraulic motors 182 which power forward movement of chassis 22. Separate motors 182 are shown for each of the four wheels 82 on which chassis 22 is mounted for maximum power, traction, and vehicular control through four wheel steering, but those skilled in the art will recognize that two motors 182 could be used to drive the respective axles 80 (not shown in FIG. 10) or even that one motor could be used to power both or a single drive axle. The speed of chassis 22 is controlled by a spring loaded throttle valve 184 mounted in control panel 70, the spring 186 acting as a "deadman's switch" to counteract the bias applied to the valve 184 by back pressure line 188 so that when the throttle valve 184 is no longer being held open by the operator, the flow of fluid through line $182_i$ will stop any movement of chassis 22. In a presently preferred embodiment, the throttle valve 184 is interconnected with a spring in the mount for the operator's seat (not shown) in cab 68 so that any time the operator leaves the seat, the throttle valve 184 is closed to prevent any possible movement of chassis 22. A three position spool valve 190 is provided in lines $182_i$ and $182_o$ for selecting forward or reverse and idle (e.g., bypassing motors 182). Power steering is also powered off of pressure line $78_o$, a conventional steering valve 192 and steering cylinder 194 mounted in the lines $194_i$ and $194_o$.

Pressure line $78_o$ also connects to first and second hydraulic cylinders 40 and 52 as follows. Referring first to the second hydraulic cylinder 52 for horizontal pivoting of wing 24 (not shown in FIG. 10, three position spool valves 196 are provided in the lines $52_i$ and $52_o$ for extending and retracting the ram 58 of hydraulic cylinder 52, the center position bypassing the flow of hydraulic fluid through cylinder 52, while maintaining pressure therein, to position the wing 24 to which cylinder 52 is mounted in the respective first or second position. A bypass 198 is also mounted in line $52_i$ to route hydraulic fluid directly into line $52_o$ in the event one of the wings 24 encounters an obstacle during forward movement of chassis 22 which causes the wing to pivot horizontally from the second position during mowing operations in a direction away from the first, traveling position, thereby preventing damage to the hydraulic components 52 and 196. Bypass 198 is also operably connected through line 200 to the throttle valve 184 to activate the "deadman's switch" function of that valve 184 to stop forward movement of the chassis 22, the valve 184, line 200 and bypass 198, together with the limit switch 202 to be described, comprising means for stopping forward movement of chassis 22 upon horizontal pivoting of wing 24 from the second position in a direction away from the first position when one of the mowers 28 mounted to a wing 24 encounters an obstacle during forward movement of chassis 22. Bypass 198 is activated by the limit switch 202 (see FIGS. 1 and 2) mounted to chassis 22 on arm 204 upon contact between limit switch and second hydraulic cylinder 52 caused by horizontal pivoting of wing 24. Those skilled in the art will recognize from this disclosure that the limit switch 202 can be mounted anywhere between chassis 22 and wing 24 that is appropriate for such contact or that the same function can be accomplished with electronics, a diaphragm-type pressure sensor, or other means known in the art, the phrase "means for stopping forward movement of chassis" having been used herein to refer to any such structure which functions in a similar manner to accomplish the intended results.

Pressure line $78_o$ also branches into the lines $40_i$ for operating the first hydraulic cylinders 40 comprising a portion of the above-described vertical pivoting means 38. Means, in the form of the spring-loaded throttle valves 206 located in lines $40_i$, are provided for increasing and decreasing the portion of the weight of wing 24 supported by vertical pivoting means 38 in response to an increase or decrease, respectively, in the portion of the weight of wing 24 supported by the wheel, or casters 63, mounted to mowers 28 by pivoting wing 24 vertically to maintain the portion of the weight of wing 24 supported by casters 63 at a selected weight, thereby causing the mowers 28 mounted on wing 24 to follow the contour of the swath being mowed. The portion of the weight supported by vertical pivoting means 38, conveniently referred to herein as the second portion of the weight of wing 24, the first portion of the weight of wing 24 being supported by the casters 63, is selected by adjusting the bias applied to throttle valve 206 by the spring 208 located therein, the back pressure line 210 counteracting that bias (alternatively, adjustment can also be accomplished by a valve (not shown) in back pressure line 210). In this manner, the hydraulic cylinder 40 is continuously extended and retracted during forward movement of chassis 22 to pivot wing 24 vertically to follow the contour of the swath being mowed.

It will be apparent from the foregoing description that the intended results can also be accomplished by providing the wing 24 with appropriate hydraulic connections for mounting to a vehicle other than chassis 22. Such a wing 24 is mounted so as to be both vertically and horizontally pivotable with respect to the vehicle to which it is mounted, and appropriate mounts are provided on the vehicle for pivotally receiving the first and second hydraulic cylinders 40 and 52. Limit switch 202 is mounted either on wing 24 or hydraulic cylinder 52 and provided with a contact arm which is bent to provide the required range of horizontal pivoting for such a wing and the appropriate controls are provided as a control pane 70 for mounting to the vehicle as well.

Although the invention has been described by reference to the presently preferred embodiments thereof, that description has been set out for purposes of exemplification and in accordance with the requirements of §122 of the Patent Statute, and not by way of limitation. Indeed, those skilled in the art may recognize from this disclosure that certain changes can be made in the structure of the preferred embodiments which have the effect of accomplishing substantially the same function as the disclosed structure in substantially the same way to achieve substantially the same result. All such changes, too numerous to be described herein, are intended to fall within the spirit and scope of the present invention as set out in the following claims.

What is claimed is:

1. A wide swath mower comprising:
   a chassis having a prime mover mounted thereto for powering forward movement of said chassis;
   a vertically pivotable wing mounted on said chassis, said wing also being horizontally pivotable with respect to said chassis at the proximal end thereof from the first, folded position for traveling to its second, open position for mowing operations;
   means mounted behind said chassis and said wing for pivoting said wing from said first to said second position;
   a plurality of mowers mounted to said wing and distal to said chassis, each of the mowers being powered by the prime mover for mowing a wide swath when said wing is pivoted to said second position;
   a wheel mounted on said wing for supporting a first portion of the weight of said wing when said wing is in said second position;
   hydraulic-actuated means mounted between said chassis ad said wing for supporting a second portion of the weight of said wing when said wing is in said second position;
   a hydraulic pressure regulator mounted in the hydraulic circuit of said hydraulic-actuated second weight supporting means for increasing and decreasing the second portion of the weight of said wing in response to an increase or decrease, respectively, in the first portion of the weight of said wing by extending and retracting sad hydraulic-actuated second weight supporting means to pivot said wing vertically to maintain the first portion of the weight of said wing at a selected weight, thereby causing the mowers mounted on said wing to follow changes in the contour of the swath being mowed; and means for stopping the forward movement of said chassis upon the horizontal pivoting of said wing from said second position in a direction away from said first position when one of the mowers mounted to said wing encounters an obstacle during forward movement of said chassis.

2. The mower of claim 1 wherein each of said mowers is powered by a hydraulic motor.

3. The mower of claim 2 wherein a reel having a cable wound therearound is mounted to the driveshaft of each of said hydraulic motors, a length of cable pulled off of said reel providing the cutting element of each mower when said motors are rotated by the passage of hydraulic fluid therethrough.

4. The mower of claim 1 additionally comprising a mower mounted on the end of said wing distal to said chassis and horizontally pivotable with respect thereto from a center position co-linear with said wing to facilitate mowing operations around an encountered obstacle.

5. The mower of claim 4 wherein the horizontally pivotable mower is also vertically pivotable.

6. The mower of claim 4 additionally comprising means for returning the horizontally pivotable mower to center after pivoting.

7. The mower of claim 4 additionally comprising means for protecting the horizontally pivotable mower from damage resulting from impact with an encountered obstacle.

8. The mower of claim 1 wherein each of the mowers is pivotally mounted to said wing for following the contour of the swath being mowed.

9. The mower of claim 8 wherein each of the mowers is provided with a caster, the plurality of casters comprising said wheel for supporting the first portion of the weight of said wing.

10. The mower of claim 8 additionally comprising means for limiting the extent to which each of the mowers is pivotable.

11. The mower of claim 1 wherein said chassis is also provided with a mower.

12. A method of mowing a wide swath comprising:
pivoting a wing mounted to a chassis at the proximal end thereof and having a prime mover mounted thereto from a first, folded position to a second, open position for mowing operations;
powering forward movement of the chassis with the prime mover to commence mowing operations;
supporting a first portion of the weight of the wing during mowing operations with a wheel mounted on the wing;
supporting a second portion of the weight of the wing from the chassis;
maintaining the second portion of the weight of the wing supported from the chassis at a selected weight by pivoting the wing vertically in response to changes in the first portion of the weight of the wing caused by changes in the contour of the swath being mowed to maintain a plurality of mowers mounted on the wing distal to the chassis at a desired height during mowing operations; and stopping forward movement of the chassis when one of the mowers encounters an obstacle, causing the wing to pivot horizontally from the second position in a direction away from the first position.

13. A method of mowing a wide swath comprising:
pivoting a wing mounted to a chassis at the proximal end thereof having a prime mover mounted thereto from a first, folded position to a second, open position for mowing operations;
powering forward movement of the chassis with the prime mover to commence mowing operations;
supporting a first portion of the weight of the wing during mowing operations with a wheel mounted on the wing;
supporting a second portion of the weight of the wing from the chassis;
pivoting the wing vertically in response to changes in the first portion of the weight of the wing to maintain a plurality of mowers mounted on the wing distal to the chassis at a desired height during mowing operations;
horizontally pivoting a mower mounted on the distal end of the wing relative to the wing from a center position co-linear with the wing when an obstacle is encountered to facilitate mowing around the encountered obstacle; and
stopping forward movement of the chassis when one of the mowers mounted on the wing encounters an obstacle, causing the wing to pivot horizontally to the second position in a direction away from the first position.

14. The method of claim 13 additionally comprising pivoting the mowers vertically relative to the wing to better follow the contour of the swath being mowed.

15. The method of claim 14 additionally comprising limiting the extent to which the mowers are pivotable.

16. The method of claim 13 additionally comprising returning the mower mounted on the distal end of the wing to the center position after an obstacle is encountered.

17. A wide swath mower comprising:
a chassis having a prime mover mounted thereto for powering forward movement of said chassis;
a vertically pivotable wing mounted on said chassis, said wing also being horizontally pivotable with respect to said chassis at the proximal end thereof from a first, folded position for traveling to a second, open position for mowing operations;
means mounted between said chassis and said wing for pivoting said wing from said first to said second position;
a plurality of mowers mounted to said wing and distal to said chassis, each of the mowers being powered by the prime mover for mowing a wide swath when said wing is pivoted to said second position;
a wheel mounted on said wing for supporting a first portion of the weight of said wing when said wing is in said second position;
means mounted between said chassis and said wing for supporting a second portion of the weight of said wing when said wing is in said second position;
means for increasing and decreasing the second portion of the weight of said wing in response to an increase or a decrease, respectively, in the first portion of the weight of said wing by pivoting said wing vertically to maintain the first portion of the weight of said wing at a selected weight, thereby causing the mowers mounted on said wing to follow the contour of the swath being mowed; and a limit switch for stopping the forward movement of said chassis when contacted by said wing upon the horizontal pivoting of said wing from said second position in a direction away from said first position when one of the mowers mounted to said wing encounters an obstacle during forward movement of said chassis.

18. The mower of claim 17, wherein said means for supporting the second portion of the weight of said wing comprises a hydraulic cylinder mounted at one end to said chassis and at the other end to said wing and said increasing and decreasing means comprises a hydraulic pressure regulator for causing said hydraulic cylinder to extend and retract to pivot said wing vertically.

* * * * *